(12) United States Patent
Date et al.

(10) Patent No.: US 8,568,509 B2
(45) Date of Patent: Oct. 29, 2013

(54) METHOD OF RECOVERING METAL (75) Inventors: Masakazu Date, Tsukuba (JP);
Tadahiro Fujitani, Tsukuba (JP);
Katsuhiro Nomura, Ikeda (JP);
Hiroyuki Kageyama, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 368 days.

(21) Appl. No.: 12/919,724

(22) PCT Filed: Feb. 25, 2009

(86) PCT No.: PCT/JP2009/053388
§ 371 (c)(1),
(2), (4) Date: Aug. 26, 2010

(87) PCT Pub. No.: WO2009/107647
PCT Pub. Date: Sep. 3, 2009

(65) Prior Publication Data
US 2011/0017022 A1    Jan. 27, 2011

(30) Foreign Application Priority Data

Feb. 27, 2008 (JP) ................................. 2008-046188
Oct. 17, 2008 (JP) ................................. 2008-268353

(51) Int. Cl.
*C22B 7/00* (2006.01)

(52) U.S. Cl.
USPC ............................... 75/384; 75/690; 420/590

(58) Field of Classification Search
USPC ..................................... 75/384, 690; 420/590
See application file for complete search history.

(56) References Cited

U.S. PATENT DOCUMENTS

| | | | | |
|---|---|---|---|---|
| 6,352,955 B1 * | 3/2002 | Golden | .......................... | 502/302 |
| 6,497,851 B1 * | 12/2002 | Hu et al. | .................... | 423/213.5 |
| 7,157,405 B2 * | 1/2007 | Suzuki et al. | .................. | 502/339 |
| 2009/0253574 A1 * | 10/2009 | Tanaka et al. | .................. | 502/303 |

FOREIGN PATENT DOCUMENTS

| | | |
|---|---|---|
| JP | 2007-51035 A | 3/2007 |
| JP | 2008-1916 A | 1/2008 |
| JP | 2008-100902 A | 5/2008 |

OTHER PUBLICATIONS

Derwent Acc No. 2008-E23664. Hirai et al. Patent Family inlcuding WO 2007138807 A1, published Dec. 6, 2007.*
Date et al., "Koso Yoshutsuho de Chosei shita Hakkin-Perovskite Shokubai no Tokui na Kassei (2)", Dai 100 Kai CatSJ Meeting A Yokoshu, Sep. 17, 2007, p. 481.

(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

A metal storage material, containing a perovskite-type composite oxide of formula (1), which is a material to stores a metal component of a metal-containing material:

$$ABH_aO_{3-b} \qquad \text{Formula (1)}$$

in which A is at least one selected from lanthanoid elements and Group 2 elements of the periodic table, and B is at least one selected from Groups 3, 4, and 13 elements, and transition metal elements of the fourth period of the periodic table; a and b are quantities of hydrogen and oxygen vacancies, within the range of: $0 \le a \le 1.0$, $0 \le b \le 0.5$, respectively; and a method of recovering a metal, containing the steps of: heating the metal-containing material, in the presence of the perovskite-type composite oxide; dissolving, in an acid, the composite oxide which stores a metal, to give an eluate of the metal; and recovering the metal, from the eluate.

12 Claims, 3 Drawing Sheets

(56) References Cited

OTHER PUBLICATIONS

Daté et al., "Unique Catalytic Activity of Platinum Eluted into Perovskite in the Solid Phase", Catalysis Letters, Sep. 2007, vol. 117, Nos. 3-4, pp. 107-111.

International Search Report for PCT/JP2009/053388 mailed Mar. 31, 2009.

Nomura et al., "Ultramarine colored: Solid-phase elution of Pt into perovskite oxides", Journal of Materials Research, Oct. 2007, vol. 22, No. 10, pp. 2647-2650.

* cited by examiner

Note: " ", ".:.", and "." denote hydrochloric acid, aqua regia, and nitric acid, respectively.

|  | Solution with conc. hydrochloric acid | Solution with aqua regia | Solution with conc. nitric acid |
|---|---|---|---|
| Concentration of rhodium (ppm) | 5.34 | 5.25 | 5.13 |
| Recovery rate of rhodium (%) | 91.9 | 90.4 | 92.1 |

METHOD OF RECOVERING METAL

TECHNICAL FIELD

The present invention relates to a method of recovering a metal component efficiently that is contained in a metal-containing material.

BACKGROUND ART

Noble metals and rare metals are excellent in stability, catalytic activity, or the like, and are used industrially in a wide range of fields. However, those metals are rare and expensive resources, and are required to be utilized effectively. It is important to efficiently recover and reuse noble metals and rare metals contained in spent noble metal or rare metal-containing waste materials, such as waste material products and materials including waste catalysts for automobile exhaust gas purification, waste catalysts for chemical industry, waste products of electronic substrate manufacturing processes, scrap electronic parts, and electrolysis electrode scraps.

The typical method of recovering such noble metals and rare metals includes the wet method (hydrometallurgy) such as an acid dissolution method or a dry method (pyrometallurgy) using a molten metal (see Non-Patent Literature 1), and in both the cases, the noble metals and rare metals are eluted in a strong acid or a liquid phase of a molten metal.
{Non-Patent Literature 1}
Kikuo Fujiwara, "Recycle of noble metal", Chemical Engineering, 55 (1), p. 21, 1991, The Society of Chemical Engineers, Japan

DISCLOSURE OF INVENTION

Technical Problem

However, waste materials containing noble metals or rare metals include a variety of kinds of products, such as electronic parts, batteries, catalysts, mobile phones, and automobile parts. Thus, in the case where recovery is conducted by the wet method or dry method, it is necessary to construct a method or system suitable for the properties of each material. Further, the material itself of the waste material is broken, by pulverization for improving the recovery efficiency, by an acid used in the wet method, or by a molten metal used in the dry method. Accordingly, even if the noble metals or the like are recovered, the material itself cannot be reused, and a post-treatment of an elution residue is complicated.

In the wet method, the extraction rate of a noble metal or rare metal in acid leaching is low. In particular, when the content of the noble metal or rare metal in a waste material is small, a relatively large amount of an eluate is required. In this case, a strong acid requires careful handling and provides a load to the environment, resulting in an expensive investment for facilities. On the other hand, in the dry method in which a molten metal of iron, copper, lead, or the like is used as a material for absorbing the noble metal or rare metal, the absorption efficiency of the noble metal or rare metal is not so high. Further, the method involves many problems, such as a high cost of apparatus and an expensive facility because the method is conducted at a high temperature, and use of the molten lead, which is harmful for the environment.

The present invention has been made in view of the above-mentioned situations of conventional technologies, and an object of the present invention is to provide a method of efficiently storing and recovering a metal, such as a noble metal or rare metal, which is contained in a material (waste material), by absorbing, once, only the metal contained in the waste material, in another material into a concentrated manner, instead of a direct treatment of the material by the wet method or dry method.

Solution to Problem

In a process of development of a perovskite-type composite oxide having a proton-conductive property, the inventors of the present invention have found out a phenomenon in which a composite oxide containing a platinum ion in its crystal lattice is formed, by heating a perovskite-type composite oxide powder put on a platinum foil at a high temperature to elute platinum in perovskite in a solid phase (Non-Patent Literature 2).

The inventors of the present invention have studied the phenomenon in more detail. As a result, the inventors have discovered that a noble metal such as platinum is eluted in the composite oxide, without bringing into contact with perovskite.

Then, the inventors presumed that the phenomenon is took place based on the followings. When platinum or the like is heated in the presence of oxygen, part of the metal is evaporated as a metal or metal oxide vapor. In the presence of a perovskite-type composite oxide having a property to take a noble metal into the crystal lattice as an ion, the thus-produced metal or metal oxide vapor is irreversibly absorbed in the composite oxide, resulting in occurrence of the phenomenon of storage of the noble metal in the composite oxide.
{Non-Patent Literature 2}
K. Nomura, M. Date, H. Kageyama and S. Tsubota, J. Mater. Res., 22, 2647 (2007)

Further, the inventors of the present invention have made intensive efforts based on the above findings, and, as a result, have found out that a metal such as platinum is stored in the composite oxide, via a gas phase, even when heating is conducted in a state in which the metal is not in contact with the composite oxide. Moreover, the inventors have found out that, even when a model waste material containing a metal at a concentration of only several percent is used instead of a pure metal substance such as a platinum foil, the noble metal is stored in the composite oxide, and that the composite oxide has an ability to store a noble metal or the like at a concentration of about 10% based on its weight.

Further, the inventors have found out that the composite oxide is readily dissolved in an inorganic or other acid, to give readily an eluate containing the noble metal or rare metal. Based on the above findings, the inventors have completed the present invention capable of more efficiently recovering the noble metal and rare metal.

That is, this application is to provide the following invention.
<1> A metal storage material, comprising the following perovskite-type composite oxide, which is a material to stores a metal component of a metal-containing material:
[Perovskite-type Composite Oxide]

Compositional Formula (1):

$$ABH_aO_{3-b} \tag{1}$$

wherein A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table;

symbols a and b represent quantities of hydrogen and oxygen vacancies, respectively, and represent values within the range below, respectively: $0 \leq a \leq 1.0$, $0 \leq b \leq 0.5$.

<2> The metal storage material according to <1>, wherein the perovskite-type composite oxide satisfies conditions in which a tolerance factor (t) defined by the following formula is within a range of 0.75 to 1.15:

Formula:

$$t=(r_A+r_O)/(2^{1/2} \cdot (r_B+r_O))$$

wherein $r_A$ represents an arithmetic mean of ionic radii of A, $r_B$ represents an arithmetic mean of ionic radii of B, and $r_O$ represents the ionic radius of oxide ion ($O^{2-}$) (1.40 Å).

<3> The metal storage material according to <1> or <2>, wherein the metal-containing material is in a solid phase state.

<4> The metal storage material according to any one of <1> to <3>, wherein the metal component is at least one element selected from Groups 6, 7, 8, 9, 10, and 11 of the periodic table.

<5> A method of storing a metal component, comprising: heating a metal-containing material in the presence of the following perovskite-type composite oxide, to store the metal component of the material in the perovskite-type composite oxide:

Composition Formula (1):
[Perovskite-type Composite Oxide]

$$ABH_aO_{3-b} \quad (1)$$

wherein A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table; symbols a and b represent quantities of hydrogen and oxygen vacancies, respectively, and represent values within the range below, respectively: $0 \leq a \leq 1.0$, $0 \leq b \leq 0.5$.

<6> The method of storing a metal component according to <5>, wherein the perovskite-type composite oxide satisfies conditions in which a tolerance factor (t) defined by the following formula is within a range of 0.75 to 1.15:

Formula:

$$t=(r_A+r_O)/(2^{1/2} \cdot (r_B+r_O))$$

wherein $r_A$ represents an arithmetic mean of ionic radii of A, $r_B$ represents an arithmetic mean of ionic radii of B, and $le_o$ represents the ionic radius of oxide ion ($O^{2-}$) (1.40 Å).

<7> The method of storing a metal component according to <5> or <6>, wherein heating is conducted in a state in which a vapor of a metal or metal oxide produced by heating the metal-containing material and the perovskite-type composite oxide is brought into contact with the composite oxide.

<8> The method of storing a metal component according to any one of <5> to <7>, wherein the metal-containing material and the perovskite-type composite oxide are heated, by placing those in one container.

<9> The method of storing a metal component according to any one of <5> to <8>, wherein heating is conducted under a state in which the metal-containing material is not brought into contact with the perovskite-type composite oxide.

<10> The method of storing a metal component according to any one of <5> to <9>, wherein a heating temperature is 900 to 1,750° C.

<11> The method of storing a metal component according to any one of <5> to <10>, wherein the metal-containing material is in a solid phase state.

<12> The method of storing a metal component according to any one of <5> to <11>, wherein the metal component is at least one element selected from Groups 6, 7, 8, 9, 10, and 11 of the periodic table.

<13> A method of eluting the metal component in an acid, comprising: treating the composite oxide according to any one of <5> to <12> in which the metal component is stored, with an acid.

<14> The method of eluting the metal component according to <13>, wherein the acid is at least one acid selected from hydrochloric acid, nitric acid, aqua regia, sulfuric acid, and acetic acid.

<15> A method of recovering the metal component, comprising: recovering the metal component eluted in the acid according to <13> or <14> from the acid.

<16> A method of producing a metal, comprising the combination of: the method of storing a metal component according to any one of <5> to <12>; the method of eluting the metal component according to <13> or <14>; and the method of recovering the metal component according to <15>.

Advantageous Effects of Invention

First, the method of the present invention of recovering a metal such as a noble metal or rare metal is characterized by merely heating a waste material or the like containing the metal, together with a given, safe, and convenient composite oxide, thereby absorbing the noble metal or rare metal contained in the waste material in the composite oxide, via a gas phase efficiently.

Further, even in a non-contact state, the noble metal or rare metal contained in the material is stored in the composite oxide through the gas phase, by using the composite oxide even if the material and the composite oxide are separately located. Thus, the method has merits in that the noble metal or rare metal can be recovered by a simple process, and it becomes readily to separate the material and the composite oxide and to reuse the material after heating, since the material is easily separated from the composite oxide which stores the noble metal or rare metal.

Further, when a waste material or the like containing a metal at a concentration of only about several ppm to several % is heated with the composite oxide to store the metal in the composite oxide in a concentrated manner and then the resultant composite oxide is treated with an acid, the amounts of a strong acid used in the wet method and a molten metal used in the dry method can be significantly decreased, as compared to a method involving directly treating a waste material or the like. Therefore, such a method is particularly useful industrially.

Furthermore, the composite oxide which stores a metal such as a noble metal or rare metal is easily dissolved in a common acid which is widely used in industrial processes, such as nitric acid or hydrochloric acid, without using aqua regia, to thereby obtain an eluate containing the noble metal or rare metal. In particular, the noble metal, such as iridium or ruthenium, is low in a solubility even in aqua regia and is required to be pretreated by, for example, converting the metal into a soluble salt. However, according to this method, the composite oxide which stores iridium, ruthenium, or the like easily elutes iridium, ruthenium, or the like, even with an acid other than aqua regia. Therefore, the conventional pretreatment to improve the solubility is not required.

MODE FOR CARRYING OUT THE INVENTION

The method of the present invention of storing a metal, such as a noble metal or rare metal, from a material containing the metal, such as the noble metal or rare metal, is characterized by, first, heating the material in the presence of the following particular perovskite-type composite oxide.
[Perovskite-type Composite Oxide]
Compositional Formula (1):

$$ABH_aO_{3-b} \tag{1}$$

In the formula, A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table; symbols a and b represent quantities of hydrogen and oxygen vacancies, respectively, and represent values within the range below, respectively: $0 \leq a \leq 1.0$, $0 \leq b \leq 0.5$, in which a tolerance factor (t) defined by the following formula is in a range of 0.75 to 1.15:
Formula:

$$t=(r_A+r_O)/(2^{1/2} \cdot (r_B+r_O))$$

wherein $r_A$ represents an arithmetic mean of ionic radii of A, $r_B$ represents an arithmetic mean of ionic radii of B, and $r_O$ represents the ionic radius of oxide ion ($O^{2-}$) (1.40 Å).

In the present invention, the material containing metal to be stored in the composite oxide (hereinafter, which may be simply referred to as "metal-containing material") means to include materials containing the metal to be stored and another substance, such as an oxide, a nitride, a carbon material, ceramics, or an organic substance.

The form and shape of the metal-containing material to be treated are not particularly limited, and a material having any form, such as a powdery, net, linear, foil, or honeycomb form, may be targeted. The state of the metal in the metal-containing material to be targeted is not particularly limited, and the metal may be contained in the material, as a single metal, an alloy, a compound, or the like. For example, metals in various states may be stored, such as a metal supported in a material of an oxide or the like, and a metal present in a coated state.

Further, the material may contain two or more kinds of metals.

In particular, in the case of treating a waste material containing a noble metal or a rare metal as a metal, such as a waste material including waste catalysts for automobile exhaust gas purification, waste catalysts for chemical industry, gas sensor scrap substrates, waste products of electronic substrate manufacturing process, scrap electronic parts, electrolysis electrode scrap products, and medical wastes such as dental wastes, the method is particularly effective as a method of storing a noble metal or rare metal from such waste materials. In this case, when the perovskite-type composite oxide according to the present invention is used, the noble metal or rare metal can be stored efficiently, from not only a material containing the noble metal or rare metal at a high content, but also a material containing the noble metal or rare metal at a concentration of only several ppm. Examples of the noble metal or rare metal to be treated include metals of Groups 6, 7, 8, 9, 10, and 11 of the periodic table. Examples of such noble metals and rare metals include Mo, Re, Ru, Rh, Ir, Pd, Pt, and Au.

The metal to be stored is not particularly limited but is preferably at least one noble metal or rare metal selected from Groups 6, 7, 8, 9, 10, and 11 of the periodic table.

Examples of the noble metals and rare metal include Mo, Re, Ru, Rh, Ir, Pd, Pt, and Au. The above-mentioned noble metals and rare metals may be used singly or as a mixture of two or more of those.

Hereinafter, the perovskite-type composite oxide that can be used in the present invention is specifically described.

The perovskite-type composite oxide that can be used in the present invention is represented by the following compositional formula (1):

$$ABH_aO_{3-b} \tag{1}$$

wherein A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table; symbols a and b represent quantities of hydrogen and oxygen vacancies, respectively, and represent values within the range below, respectively: $0 \leq a \leq 1.0$, $0 \leq b \leq 0.5$.

In the composite oxide represented by the compositional formula (1), examples of the component A, include La, Ce, Pr, and Nd, as the lanthanoid element; and Ca and Sr, as the Group 2 elements of the periodic table. The lanthanoid elements and the Group 2 elements of the periodic table may be used singly or in combination of two or more of those. Examples of the component B, include Sc and Y, as the Group 3 elements of the periodic table; Ti, Zr, and Hf, as the Group 4 elements of the periodic table; Al, Ga, and In, as the Group 13 elements of the periodic table; and Cr, Mn, Fe, Co, Ni, Cu, and Zn, as the transition metal elements of the fourth period of the periodic table. The Group 3 elements, Group 4 elements, Group 13 elements, and transition metal elements of the fourth period of the periodic table may be used singly or in combination of two or more kinds of those.

In the compositional formula (1), a is $0 \leq a \leq 1.0$, preferably $0 \leq a \leq 0.5$, and more preferably $0 \leq a \leq 0.3$. Further, b is $0 \leq b \leq 0.5$, preferably $0 \leq b \leq 0.25$, and more preferably $0 \leq b \leq 0.15$.

Note that, in the case where the compositional formula (1) includes an alkaline-earth metal with high basicity, such as Ba or Sr, it is preferable that a heat treatment is conducted at a high temperature in a state in which the composite oxide is in contact with the material containing a noble metal or rare metal, so that the alkaline-earth metal is relatively easily allowed to react with the noble metal or rare metal, to form an alloy, thereby to lower the melting point, and to make it possible to produce a noble metal or rare metal vapor or a noble metal or rare metal oxide vapor having a higher pressure (partial pressure) at a lower temperature.

Further, the composite oxide represented by the compositional formula (1) is required to have a tolerance factor (t), defined by the following formula in a range of 0.75 to 1.15:

$$t = (r_A + r_O)/(2^{1/2} \cdot (r_B + r_O))$$

In the definition formula for the tolerance factor, $r_A$ represents an arithmetic mean of ionic radii of a cation on site A, i.e. A, in the compositional formula (1); and $r_B$ represents an arithmetic mean of ionic radii of a cation on site B, i.e. B, in the compositional formula (1). $r_O$ represents the ionic radius of oxide ion ($O^{2-}$) and is 1.40 Å.

The tolerance factor (t) defined by the above formula, shows the distortion degree of the crystal structure of the perovskite-type composite oxide. When the tolerance factor is 1, such a structure is presumed to be an ideal perovskite-type structure (cubic system). When the tolerance factor is larger than 1, the structure is a distorted perovskite-type structure, since the size of the cation on site A is too large compared with that of the cation on site B. On the other hand, when the tolerance factor is smaller than 1, the structure is similarly a distorted perovskite-type structure, since the size of the cation on site B is too large compared with that of the cation on site A. In the case where a noble metal is stored in a composite oxide having a perovskite-type structure, the noble metal ion desirably diffuses at high speed in the perovskite-type crystal structure, and moves to a stable site in a short period of time. To achieve this, a perovskite-type compound having a tolerance factor of about 1, which is nearly ideal cubic system, is desirably used as a storage material. The tolerance factor may be calculated, for example, based on a literature which describes the sizes of ion radii (R.D. Shannon, Acta Cryst., A32, 751 (1976)), from the ion radius of each ion by the above-mentioned definition formula.

In the present invention, it is necessary to use a perovskite-type composite oxide having a tolerance factor (t) of 0.75 to 1.15. To achieve a relatively stable crystal structure, the factor is in a range of preferably 0.8 to 1.10, more preferably 0.9 to 1.05. When such a perovskite-type composite oxide is used, a noble metal or rare metal can be readily stored from a material containing a metal such as the noble metal or rare metal.

The composite oxide represented by the compositional formula (1) is a known substance shown in "K. Nomura et al., J. Mater. Res., 22, 2647 (2007)", and can be obtained by a known method such as the solid phase reaction method, or the coprecipitation method, according to the method described, for example, in "Experimental Chemical Lecture (Jikken-Kagaku-Koza)" 4th ed., vol. 16, 'Inorganic Compound', edited by The Chemical Society of Japan, Maruzen Co., Ltd., 1993. For example, in the solid phase reaction method, a compound containing metal elements included in the above-mentioned compositional formula, such as an oxide, a carbonate, or an organic compound, is used as a starting material, and it is mixed so that the resultant mixture has the same metal element ratio as that of the target oxide, followed by firing, to thereby obtain a target perovskite-type composite oxide. Specific firing temperature and firing time are not particularly limited and may be set to any conditions where the target composite oxide is formed. For example, firing may be conducted at a temperature in a range of about 1,200 to 1,500° C. for about 10 to 40 hours. Note that, in the case where a carbonate, an organic compound, or the like is used as a raw material substance, it is preferred to conduct pre-firing before firing to decompose the raw material substance, followed by firing, to thereby form a target composite oxide. For example, in the case where the carbonate is used as a raw material substance, pre-firing may be conducted at about 1,000 to 1,200° C. for about 10 hours, followed by firing under the above-mentioned conditions. The firing means is not particularly limited, and any means, such as an electric heating furnace or a gas heating furnace, may be employed. The firing may generally be conducted in an oxidizing atmosphere, such as in oxygen stream or in air. In the case where the raw material substance contains a sufficient amount of oxygen, firing may be conducted in an inert atmosphere, for example.

Metal Storage Method

In the method of the present invention of storing a metal component from a metal-containing material, firstly, heating may be conducted in a state in which a vapor of a metal produced from the metal-containing material or a vapor of an oxide of the metal can be brought into contact with the predetermined perovskite-type composite oxide, thereby storing the metal in the composite oxide.

The heating temperature is not particularly limited as long as a metal, such as a noble metal or rare metal, contained in the material can turn into a vapor. The temperature is generally about 800° C. or higher and lower than the decomposition temperature of the composite oxide. Specifically, the temperature is preferably about 900 to 1,750° C., more preferably about 1,050 to 1,650° C.

In the present invention, a mechanism of storage, by the heating, of a metal, such as a noble metal or rare metal, contained in the metal-containing material into the perovskite-type composite oxide, has not been clarified at present. It is presumed that the noble metal or rare metal contained in the metal-containing material is stored by the followings: [1] when the metal such as the noble metal or rare metal is heated in the presence of oxygen, a noble metal or rare metal oxide vapor having almost the same partial pressure may be generated, at a temperature lower than that in the case of the noble metal or rare metal alone; [2] in the case where the predetermined composite oxide contains a basic alkaline earth metal, the alkaline earth metal which is evaporated by heating is brought into contact with the noble metal or rare metal to be recovered, to thereby form an alloy or a composite oxide, resulting in lowering the melting point of the noble metal or rare metal, which causes an environment where a noble metal or rare metal vapor is easily produced; and [3] the predetermined composite oxide has a site where a noble metal or rare metal ion is stably included, and part of the noble metal or rare metal is taken and absorbed in the site by substitution or making solid solution by constitutional elements of the composite oxide.

In the present invention, to conduct the metal storage reaction in a shorter time, the vapor of a metal or noble metal is preferably efficiently brought into contact with the composite oxide. Specifically, it is preferred to bring the vapor of a metal or metal oxide having a pressure (partial pressure) as high as possible, into contact with the composite oxide at a temperature as high as possible. To achieve this, it is preferred to bring the noble metal or rare metal-containing material into contact with a composite oxide powder, and it is more preferred to bring the noble metal or rare metal-containing material into contact with the composite oxide powder and to allow a reaction of the material with the powder desirably at a temperature which is lower than the decomposition temperature of the composite oxide but is close to the decomposition temperature as high as possible.

Further, the heating of the metal-containing material and the composite oxide may be conducted in a contact state or in a non-contact state. Of these methods, the method involving heating in a non-contact state does not necessarily require to conduct a pretreatment such as pulverization to ensure the contact between the metal-containing material and the perovskite-type composite oxide of the present invention. Further, the method has an advantage in that the metal-containing material and the composite oxide are easily separated after heating since in this mode they can be easily separated. On the other hand, in the case where heating is conducted in a contact state, the recovery efficiency can be increased because the distance between the metal-containing material and the composite oxide is short.

The pressure (partial pressure) of the vapor of a metal or metal oxide in a container is not particularly limited, but, in general, the pressure is preferably about $10^{-3}$ Pa or more, more preferably about 1 Pa or more. In this case, when the pressure (partial pressure) of the vapor of a metal or metal oxide is raised, the reaction time can be shortened.

The reaction time is not particularly limited. In the case where heating is conducted at a temperature in the above-mentioned range, the reaction time is preferably about 5 to 20 hours, more preferably about 10 to 15 hours.

Specific examples of the storage method includes a method which involves heating the composite oxide represented by the compositional formula (1) and a metal, a metal-containing mixture, or a metal-containing compound, which are placed in one container, to a temperature at which a metal vapor or metal oxide vapor is produced, thereby bringing the composite oxide into contact with the metal vapor or metal oxide vapor. In this case, it is not necessary to completely seal the reaction container, as long as the metal vapor or metal oxide vapor is sufficiently in contact with the composite oxide.

In such a storage method, the shape of the composite oxide is not particularly limited. For example, the composite oxide may be used in a form of a powdery product, a porous material obtained by press forming of the powder, or a sintered product.

As described above, it is not necessary to completely seal the reaction container as long as the metal vapor or metal oxide vapor contained in the metal-containing material may be sufficiently brought into contact with the composite oxide in the reaction container. However, the container is required to be sealed enough to prevent dispersion of the vapor produced. In the reaction container, it is enough that the metal vapor or metal oxide vapor produced from the metal-containing material can be brought into contact with the composite oxide, and the metal-containing material to be treated and the composite oxide may be in a contact state or in a non-contact state. For example, any of the following may be applied: a method involving heating in a state in which the composite oxide is put on a material containing a noble metal or rare metal; or a method involving heating the material and the composite oxide which are arranged in the container at any interval under a non-contact state.

In particular, according to the latter non-contact heating method, a metal such as a noble metal or a rare metal contained in the material can be recovered by simple procedures, since the metal is stored in the composite oxide, even if the material and the composite oxide are separately located. Further, since the metal-containing material is easily separated from the metal-storing composite oxide, the method has a merit of easy separation of the material and the composite oxide after the heating.

Method of Eluting and Regenerating Metals

Hereinafter, a method of eluting a metal in an acid, from the perovskite-type composite oxide which stores the metal, is described. The acid is not particularly limited, and specific examples thereof include one or two or more of acids selected from the group consisting of hydrofluoric acid, hydrochloric acid, nitric acid, sulfuric acid, phosphoric acid, formic acid, and acetic acid. Further, a mixture of those acids, such as aqua regia, may be used. To elute the metal efficiently in a short time period, a strong acid having high reactivity with the composite oxide, such as hydrochloric acid, nitric acid, or aqua regia, is preferably used. However, from the viewpoint of environmental load, an acid containing no halogen, such as nitric acid or sulfuric acid, and a weak acid, such as acetic acid, are preferred.

Generally, the noble metal is dissolved only in an acid having high oxidizability, such as aqua regia, but iridium and ruthenium have low solubility even in aqua regia. However, a metal-containing composite oxide which is formed from the perovskite-type composite oxide of the present invention is easily dissolved even in an acid other than aqua regia. Therefore, even if the noble metal stored in the composite oxide is iridium or ruthenium, the noble metal can be easily eluted with any of various acids. This is presumed that, although noble metal atoms which form strong metallic bonds are hardly dissolved with an acid, noble metals which are separately included as ions in the lattice of the composite oxide and form relatively weak bonds with adjacent oxide ions are easily dissolved together with the crystal lattice with an acid.

The concentration of the acid is not particularly limited, but the concentration is preferably as high as possible from the viewpoint of the reaction time and elution efficiency. However, when the concentration of the acid is too high, the water content becomes relatively low and causes formation of precipitates or the like, resulting in delay of the reaction, in some cases. Further, from the viewpoint of environmental load, the concentration of the acid is preferably low. From the viewpoint of those, the concentration of the acid may be appropriately determined.

The method of bringing the composite oxide which stores a metal therein into contact with the acid is not particularly limited, and generally involves immersing the composite oxide in the acid and, if necessary, heating the resultant acid.

The heating temperature may be one at which the perovskite-type structure of the composite oxide is decomposed in an acid to disperse components of the composite oxide into the acid and to elute a metal contained in the composite oxide into a resultant solution. The temperature is generally one of the room temperature or higher but lower than the boiling point of the acid. In particular, in consideration of the reaction time and elution efficiency, the temperature is preferably about 30 to 100° C.

The metal eluted in an acid by the above-mentioned method can be regenerated as a solid metal, by a known method, for example, of: a method of reduction with a reductant, as described in Non-Patent Literature 3; a recovery method by a cementation process using a metal, such as Zn; a recovery method by adsorption of the metal on an ion-exchange resin or activated carbon; a method involving recovery, separation and purification via a solvent extraction process; or a recovery method by an electrolytic process. In particular, in the case where a waste material containing a noble metal, a rare metal, or the like is treated, these methods are very advantageous because highly value-added metals can be reused efficiently at lower costs, by a simple method.

{Non-Patent Literature 3}

Junji Shibata, Akihiko Okuda "Recycling technique for noble metals", SHIGEN-TO-SOZAI (Resources and materials), vol. 118, No. 1, p. 1, 2002, SHIGEN SOZAI GAKKAI

EXAMPLES

Hereinafter, the present invention is described in more detail by way of examples.

Example 1

[Preparation of Perovskite-type Composite Oxide Powder]

Figure 1:
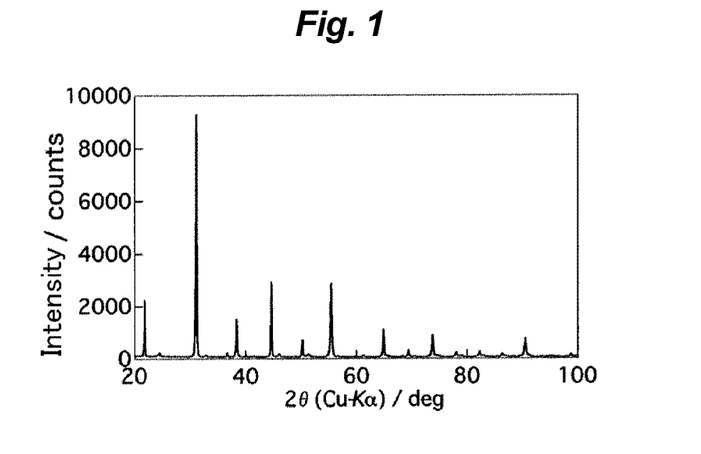
{FIG. 1} An X-ray diffraction pattern of a perovskite-type composite oxide powder obtained in Example 1.

$La_2O_3$, $SrCO_3$, $BaCO_3$, and $Sc_2O_3$ were used as raw materials, and the raw materials were mixed so that the element ratio of La:Sr:Ba:Sc would be 0.7:0.2:0.1:1.0. Then, the resultant mixture was repeatedly fired and pulverized in air several times, and finally fired in air at 1,400° C. for 10 hours, to thereby prepare a pale yellow oxide powder represented by the compositional formula: $(La_{0.7}Sr_{0.2}Ba_{0.1})ScH_{0.05}O_{2.875}$. The tolerance factor of the resultant composite oxide powder was found to be 0.92. FIG. 1 is an X-ray diffraction pattern of the resultant powder sample, and shows that a single-phase perovskite-type composite oxide powder having good crystallinity was obtained.

[Storage of Palladium Contained in Palladium-supporting Oxide Catalyst Powder, by Using Perovskite-type Composite Oxide]

Figure 2:
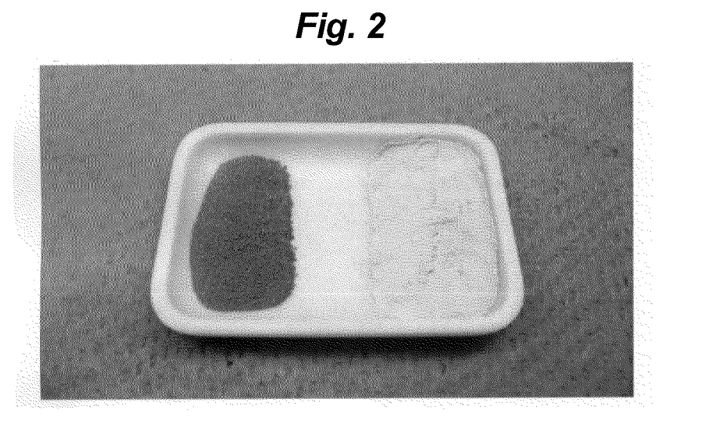
{FIG. 2} A palladium-supporting alumina powder (left) and a perovskite-type composite oxide powder (right), before firing at 1,525° C. for 10 hours in Example 1.
Figure 3:
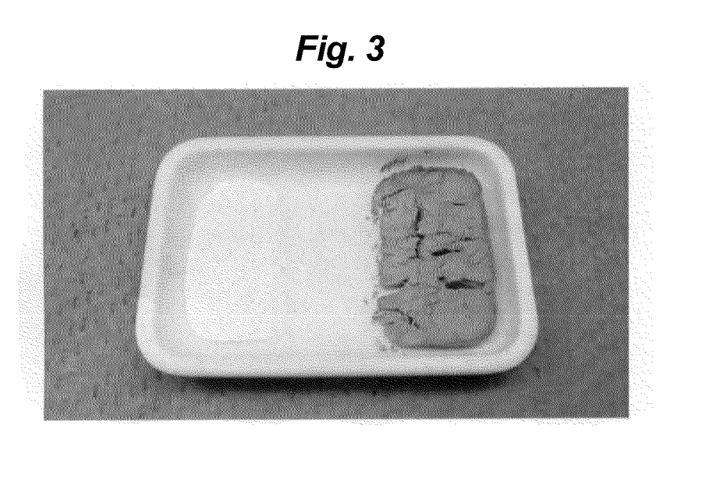
{FIG. 3} The alumina powder (left) and the composite oxide powder containing palladium (right), after firing at 1,525° C. for 10 hours in Example 1.

The pale yellow oxide powder (2 g) represented by the compositional formula: $(La_{0.7}Sr_{0.2}Ba_{0.1})ScH_{0.05}O_{2.875}$, as obtained by the above-mentioned method, and 1 wt % palladium-supporting alumina powder (0.5 g, brown) were placed in one container with a lid (made of alumina, rectangular solid shape, volume: about 30 cm³), as shown in FIG. 2, so that the powders were not in contact with each other, followed by firing in air at 1,525° C. for 10 hours, to obtain a pale brown palladium-containing composite oxide powder represented by the compositional formula: $(La_{0.7}Sr_{0.2}Ba_{0.1})(Sc_{0.995}Pd_{0.005})H_{0.05}O_{2.8725}$ and a colorless alumina powder, as shown in FIG. 3.

Example 2

[Storage of Platinum Contained in Platinum-supporting Oxide Catalyst Powder, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 1 wt % platinum-supporting alumina powder (1 g, pale yellow) were placed in one container with a lid (made of alumina, rectangular solid shape, volume: about 30 cm³) so that the powders were not in contact with each other, followed by firing in air at 1,525° C. for 10 hours, to obtain a blue platinum-containing composite oxide powder represented by the compositional formula: $(La_{0.7}Sr_{0.2}Ba_{0.1})(Sc_{0.994}Pt_{0.006})H_{0.05}O_{2.878}$ and a colorless alumina powder.

Example 3

[Storage of Rhodium Contained in Rhodium-supporting Oxide Catalyst Powder, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 1 wt % rhodium-supporting alumina powder (0.5 g, pale green brown) were placed in one container with a lid (made of alumina, rectangular solid shape, volume: about 30 cm³) so that the powders were not in contact with each other, followed by firing in air at 1,525° C. for 10 hours, to obtain a dark blue rhodium-containing composite oxide powder represented by the compositional formula: $(La_{0.7}Sr_{0.2}Ba_{0.1})(Sc_{0.995}Rh_{0.005})H_{0.05}O_{2.875}$ and a colorless alumina powder.

Example 4

[Storage of Ruthenium Contained in Ruthenium-supporting Oxide Catalyst Powder, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 1 wt % ruthenium-supporting alumina powder (0.5 g, green) were placed in one container with a lid (made of alumina, rectangular solid shape, volume: about 30 cm³) so that the powders were not in contact with each other, followed by firing in air at 1,525° C. for 10 hours, to obtain an orange ruthenium-containing composite oxide powder represented by the compositional formula: $(La_{0.7}Sr_{0.2}Ba_{0.1})(Sc_{0.995}Ru_{0.005})H_{0.05}O_{2.8775}$ and a colorless alumina powder.

Example 5

[Storage of Iridium Contained in Iridium-supporting Oxide Catalyst Powder, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 1.5 wt % iridium-supporting alumina powder (0.5 g, blue) were placed in one container with a lid (made of alumina, rectangular solid shape, volume: about 30 cm³) so that the powders were not in contact with each other, followed by firing in air at 1,525° C. for 10 hours, to obtain a red-brown iridium-containing composite oxide powder represented by the compositional formula: $(La_{0.7}Sr_{0.2}Ba_{0.1})(Sc_{0.996}Ir_{0.004})H_{0.05}O_{2.875}$ and a colorless alumina powder.

Example 6

[Storage of Palladium Contained in Palladium-supporting Oxide Honeycomb Catalyst, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 0.5 wt % palladium-supporting cordierite honeycomb (0.2 g, black) were placed in one container with a lid (made of alumina, rectangular solid shape, volume: about 30 cm³) so that the powder and honeycomb were not in contact with each other, followed by firing in air at 1,525° C. for 10 hours, to melt the cordierite honeycomb, and to thereby obtain a pale brown palladium-containing composite oxide powder represented by the compositional formula:

Example 7

[Storage of Platinum Contained in Platinum-supporting Oxide Honeycomb Catalyst, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 0.5 wt % platinum-supporting cordierite honeycomb (0.2 g, black) were placed in one container with a lid (made of alumina, rectangular solid shape, volume: about 30 cm³) so that the powder and honeycomb were not in contact with each other, followed by firing in air at 1,525° C. for 10 hours, to melt the cordierite honeycomb, and to thereby obtain a blue platinum-containing composite oxide powder represented by the compositional formula:

$(La_{0.7}Sr_{0.2}Ba_{0.1})(Sc_{0.999}Pt_{0.001})H_{0.05}O_{2.8755}$.

Example 8

[Storage of Platinum Contained in Platinum-supporting Carbon Electrode Catalyst Powder, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 40 wt % platinum-supporting carbon powder (0.025 g, black) were placed in one container with a lid (made of alumina, rectangular solid shape, volume: about 30 cm³) so that the powders were not in contact with each other, followed by firing in air at 1,525° C. for 10 hours, to cause the carbon powder to disappear, and to thereby obtain a blue platinum-containing composite oxide powder represented by the compositional formula:

$(La_{0.7}Sr_{0.2}Ba_{0.1})(Sc_{0.994}Pt_{0.006})H_{0.05}O_{2.878}$.

Example 9

[Storage of Platinum/Rhodium Contained in Platinum/Rhodium-containing Furnace Material, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and platinum/rhodium-containing alumina cement (in weight ratio platinum:rhodium=7:3, weight 5.8 g) were placed in one container with a lid (made of alumina, rectangular solid shape, volume: about 30 cm³) so that the powder and cement were not in contact with each other, followed by firing in air at 1,525° C. for 10 hours, to transit noble metal components on the surface of the furnace material, and to thereby obtain a blue platinum/rhodium-containing composite oxide powder.

Example 10

[Storage of Molybdenum Contained in Molybdenum Foil, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and a molybdenum foil (thickness: 0.1 mm, weight: 0.35 g) were placed in one container with a lid (made of alumina, rectangular solid shape, volume: about 30 cm³) so that the powder and foil were not in contact with each other, followed by firing in air at 1,525° C. for 10 hours, to cause the molybdenum foil to disappear, and to thereby obtain a blue-green molybdenum-containing composite oxide powder represented by the compositional formula:

$(La_{0.7}Sr_{0.2}Ba_{0.1})(Sc_{0.75}Mo_{0.25})H_{0.02}O_{2.985}$.

Example 11

[Storage of Gold Contained in Gold-supporting Oxide Catalyst Powder, by Using Perovskite-type Composite Oxide Powder]

The pale yellow oxide powder (2 g) represented by the compositional formula: $(La_{0.7}Sr_{0.2}Ba_{0.1})ScH_{0.05}O_{2.875}$, obtained in the same manner as in Example 1, and 1.5 wt % gold-supporting titania powder (weight 0.5 g, purple) were placed in one container with a lid (made of alumina, rectangular solid shape, volume: about 30 cm³) so that the powders were not in contact with each other, followed by firing in air at 1,525° C. for 50 hours, to obtain a pale brown gold-containing composite oxide powder represented by the compositional formula:

$(La_{0.7}Sr_{0.2}Ba_{0.1})(ScAu_{0.000006})H_{0.05}O_{2.875}$ and a green titania powder.

Example 12

[Storage of Rhenium from Rhenium Foil, by Using Perovskite-type Composite Oxide Powder]

The pale yellow oxide powder (1.5 g) represented by the compositional formula: $(La_{0.7}Sr_{0.2}Ba_{0.1})ScH_{0.05}O_{2.875}$, obtained in the same manner as in Example 1, and a rhenium foil (thickness: 0.025 mm, weight: 0.096 g) were placed in one container with a lid (made of alumina, rectangular solid shape, volume: about 30 cm³) so that the powder and foil were not in contact with each other, followed by firing in air at 1,600° C. for 10 hours, to cause the rhenium foil to disappear, and to thereby obtain an orange rhenium-containing composite oxide powder represented by the compositional formula:

$(La_{0.7}Sr_{0.2}Ba_{0.1})(Sc_{0.965}Re_{0.035})H_{0.05}O_{2.8925}$.

Example 13

[Preparation of Perovskite-type Composite Oxide Powder]

Figure 4:
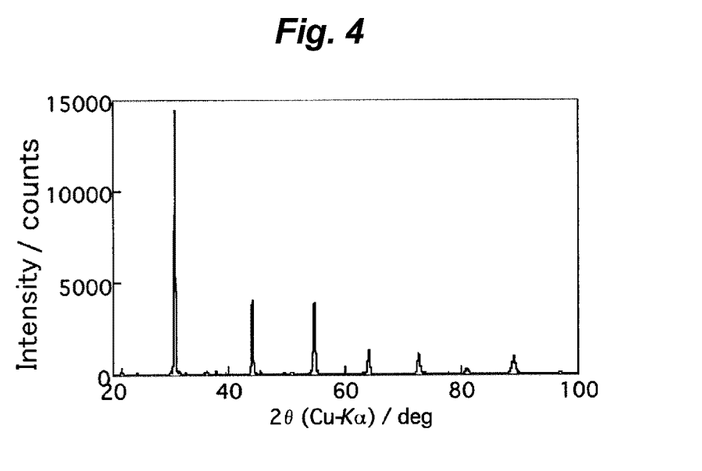
{FIG. 4} An X-ray diffraction pattern of a perovskite-type composite oxide powder obtained in Example 13.

$SrCO_3$, $ZrO_2$, and $Y_2O_3$ were used as raw materials, and the raw materials were mixed so that the element ratio of Sr:Zr:Y would be 1.0:0.9:0.1. Then, the resultant mixture was repeatedly fired and pulverized in air several times, and finally fired in air at 1600° C. for 10 hours, to thereby produce a pale yellow oxide powder represented by the compositional formula:

$Sr(Zr_{0.9}Y_{0.1})H_{0.05}O_{2.975}$. The tolerance factor of the resultant composite oxide powder was found to be 0.94. FIG. 4 is an X-ray diffraction pattern of the resultant powder sample, and shows that a single-phase perovskite-type composite oxide powder having good crystallinity was obtained.

[Storage of Platinum from Platinum Foil, by Using Perovskite-type Composite Oxide]

The pale yellow oxide powder (1.5 g) represented by the compositional formula: $Sr(Zr_{0.9}Y_{0.1})H_{0.05}O_{2.975}$, as obtained by the above-mentioned method, and a platinum foil (thickness: 0.03 mm, weight: 0.168 g) were placed in one container with a lid (made of alumina, rectangular solid shape, volume: about 30 cm³) so that the powder and foil were not in contact with each other, followed by firing in air at 1,600° C. for 10 hours, to thereby obtain a blue platinum-containing composite oxide powder represented by the compositional formula:

$Sr(Zr_{0.899}Y_{0.099}Pt_{0.002})H_{0.05}O_{2.9755}$.

Example 14

[Storage of Ruthenium from Ruthenium Foil, by Using Perovskite-type Composite Oxide]

The pale yellow oxide powder (1.5 g) represented by the compositional formula: $Sr(Zr_{0.9}Y_{0.1})H_{0.05}O_{2.975}$, obtained in the same manner as in Example 13, and a ruthenium foil (thickness: 0.1 mm, weight: 0.23 g) were placed in one container with a lid (made of alumina, rectangular solid shape, volume: about 30 cm³) so that the powder and foil were not in contact with each other, followed by firing in air at 1,325° C. for 5 hours, to shrink the ruthenium foil, and to thereby obtain a dark brown ruthenium-containing composite oxide powder represented by the compositional formula: $Sr(Zr_{0.838}Y_{0.038}Ru_{0.124})H_{0.03}O_{2.996}$.

Example 15

[Storage of Iridium from Iridium Foil, by Using Perovskite-type Composite Oxide Powder]

The pale yellow oxide powder (1.5 g) represented by the compositional formula: $Sr(Zr_{0.9}Y_{0.1})H_{0.05}O_{2.975}$, obtained in the same manner as in Example 13, and a iridium foil (thickness: 0.05 mm, weight: 0.13 g) were placed in one container with a lid (made of alumina, rectangular solid shape, volume: about 30 cm³) so that the powder and foil were not in contact with each other, followed by firing in air at 1,600° C. for 10 hours, to shrink the iridium foil, and to thereby obtain a brown iridium-containing composite oxide powder represented by the compositional formula: $Sr(Zr_{0.889}Y_{0.089}Ir_{0.022})H_{0.05}O_{2.9695}$.

Example 16

[Preparation of Perovskite-type Composite Oxide Powder]

Figure 5:
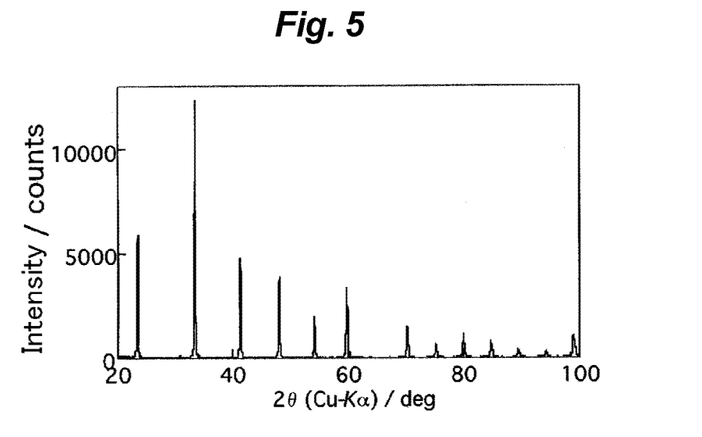
{FIG. 5} An X-ray diffraction pattern of a perovskite-type composite oxide powder obtained in Example 16.

$La_2O_3$, $CaO$, and $Al_2O_3$ were used as raw materials, and the raw materials were mixed so that the element ratio of La:Ca:Al would be 0.9:0.1:1.0. Then, the resultant mixture was repeatedly fired and pulverized in air several times, and finally fired in air at 1,600° C. for 20 hours, to thereby produce a pale red oxide powder represented by the compositional formula: $(La_{0.9}Ca_{0.1})AlO_{2.95}$. The tolerance factor of the resultant composite oxide powder was found to be 1.01. FIG. 5 is an X-ray diffraction pattern of the resultant powder sample, and shows that a single-phase perovskite-type composite oxide powder having good crystallinity was obtained.

[Storage of Platinum Contained in Platinum Foil, by Using Perovskite-type Composite Oxide]

The pale red oxide powder (0.8 g) represented by the compositional formula: $(La_{0.9}Ca_{0.1})AlO_{2.95}$, as obtained by the above-mentioned method, and a platinum foil (thickness: 0.03 mm, weight: 0.16 g) were placed in one container with a lid (made of alumina, rectangular solid shape, volume: about 30 cm³) so that the powder and foil were not in contact with each other, followed by firing in air at 1,600° C. for 10 hours, to obtain a pale brown platinum-containing composite oxide powder represented by the compositional formula:

$(La_{0.9}Ca_{0.1})(AlPt_{0.000002})O_{2.95}$.

Example 17

[Preparation of Perovskite-type Composite Oxide Powder]

Figure 6:
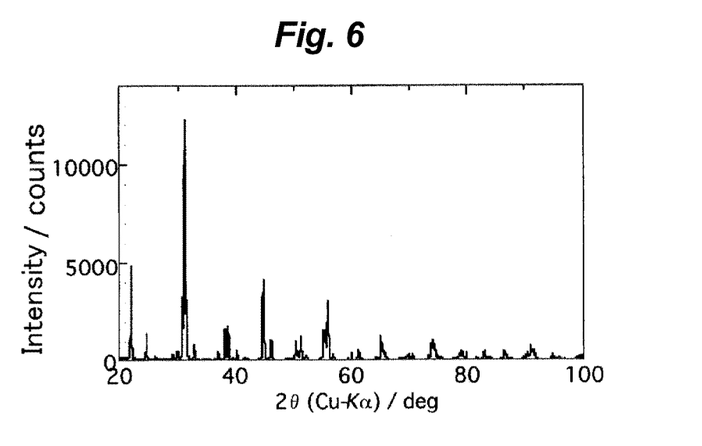
{FIG. 6} An X-ray diffraction pattern of a perovskite-type composite oxide powder obtained in Example 17.

$La_2O_3$, $Sc_2O_3$, and $ZnO$ were used as raw materials, and the raw materials were mixed so that the element ratio of La:Sc:Zn would be 1.0:0.95:0.05. Then, the resultant mixture was repeatedly fired and pulverized in air several times, and finally fired in air at 1,600° C. for 10 hours, to thereby produce a pale yellow oxide powder represented by the compositional formula: $La(Sc_{0.95}Zn_{0.05})H_{0.02}O_{2.985}$. The tolerance factor of the resultant composite oxide powder was found to be 0.91. FIG. 6 is an X-ray diffraction pattern of the resultant powder sample, and shows that a single-phase perovskite-type composite oxide powder having good crystallinity was obtained.

[Storage of Platinum from Platinum Foil, by Using Perovskite-type Composite Oxide]

The pale red oxide powder (2 g) represented by the compositional formula: $La(Sc_{0.95}Zn_{0.05})H_{0.02}O_{2.985}$, as obtained by the above-mentioned method, and a platinum foil (thickness: 0.03 mm, weight: 0.18 g) were placed in one container with a lid (made of alumina, rectangular solid shape, volume: about 30 cm³) so that the powder and foil were not in contact with each other, followed by firing in air at 1,600° C. for 10 hours, to obtain a pale brown platinum-containing composite oxide powder represented by the compositional formula:

$La(Sc_{0.9498}Zn_{0.0498}Pt_{0.0004})H_{0.02}O_{2.9853}$.

Example 18

[Elution of Rhodium Contained in Rhodium-containing Composite Oxide Powder, with Concentrated Hydrochloric Acid]

Figure 7:
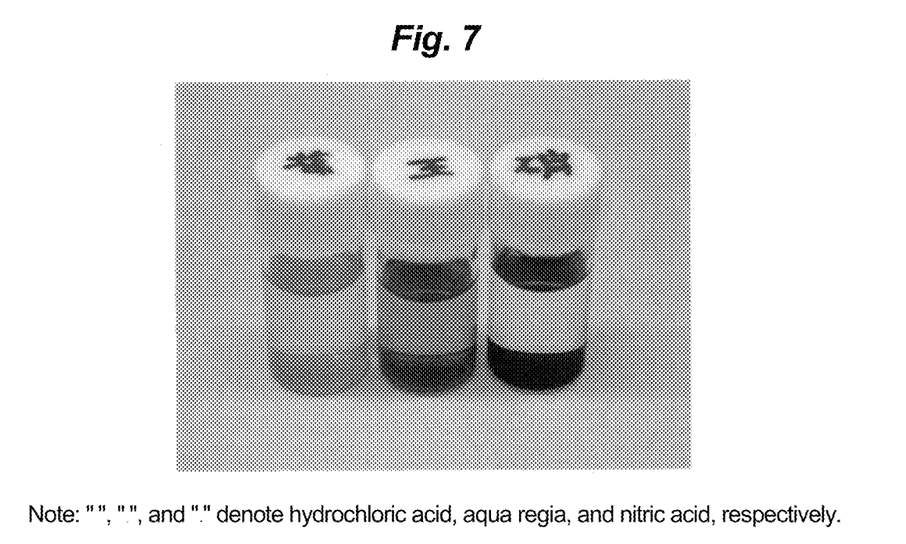
{FIG. 7} States of rhodium-containing composite oxide powders, after heating at 60° C. for 1 hour in concentrated hydrochloric acid (left), aqua regia (center), and concentrated nitric acid (right), in Examples 18, 19, and 20, respectively.
Figure 8:
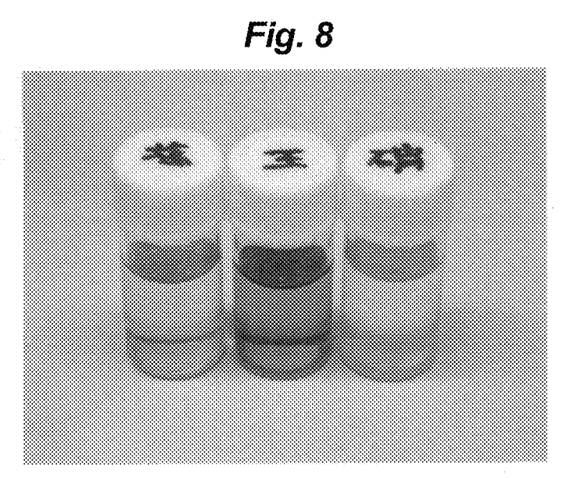
{FIG. 8} States of rhodium-containing composite oxide powders, after heating at 60° C. for 6 hours in concentrated hydrochloric acid (left), aqua regia (center), and concentrated nitric acid (right), in Examples 18, 19, and 20, respectively.
Figure 9:
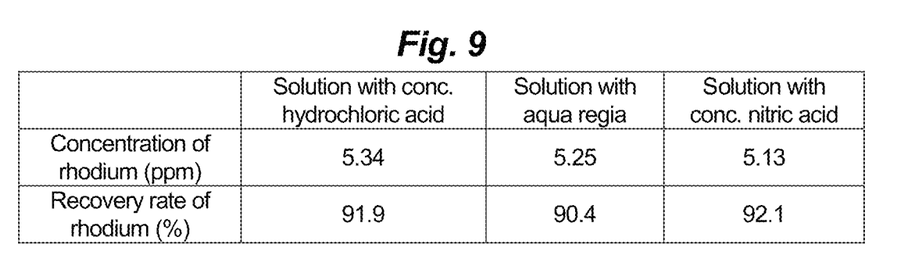
{FIG. 9} The results of ICP measurement for determining concentrations of rhodium contained in solutions prepared by 25-fold diluting the solutions of rhodium-containing composite oxide powders in concentrated hydrochloric acid, aqua regia, and concentrated nitric acid, respectively, obtained in Examples 18, 19, and 20; and rhodium recovery rates.

To 20 mg of a black rhodium-containing composite oxide powder represented by the compositional formula: $(La_{0.7}Sr_{0.2}Ba_{0.1})(Sc_{0.937}Rh_{0.063})H_{0.05}O_{2.875}$, was added 4 ml of concentrated hydrochloric acid, followed by heating at 60° C. As a result, as shown in FIGS. 7 and 8, the powder was gradually dissolved, and 6 hours later, precipitates disappeared, to thereby obtain a pale red solution. The results of an inductively coupled plasma (ICP) analysis revealed that at least 90 percents or more of rhodium contained in the composite oxide powder, were dissolved in the solution, as shown in FIG. 9.

Example 19

[Elution of Rhodium Contained in Rhodium-containing Composite Oxide Powder, with Aqua Regia]

To 20 mg of a black rhodium-containing composite oxide powder represented by the compositional formula: $(La_{0.7}Sr_{0.2}Ba_{0.1})(Sc_{0.937}Rh_{0.063})H_{0.05}O_{2.875}$, was added 4 ml of aqua regia, followed by heating at 60° C. As a result, as shown in FIGS. 7 and 8, the powder was gradually dissolved, and 9 hours later, precipitates disappeared, to thereby obtain an orange-red solution. The results of an inductively coupled plasma (ICP) analysis revealed that at least 90 percents or more of rhodium contained in the composite oxide powder, were dissolved in the solution, as shown in FIG. 9.

Example 20

[Elution of Rhodium Contained in Rhodium-containing Composite Oxide Powder, with Concentrated Nitric Acid]

To 20 mg of a black rhodium-containing composite oxide powder represented by the compositional formula: $(La_{0.7}Sr_{0.2}Ba_{0.1})(Sc_{0.937}Rh_{0.063})H_{0.05}O_{2.875}$, was added 4 ml of concentrated nitric acid, followed by heating at 60° C. As a result, as shown in FIGS. 7 and 8, the powder was gradually dissolved, and 12 hours later, a pale yellow solution containing colorless precipitates was obtained. By adding a small amount of water thereto, the precipitates were dissolved. The results of an inductively coupled plasma (ICP) analysis revealed that at least 90 percents or more of rhodium contained in the composite oxide powder, were dissolved in the solution, as shown in FIG. 9.

Example 21

[Elution of Palladium Contained in Palladium-containing Composite Oxide Powder, with Concentrated Hydrochloric Acid]

To 20 mg of a pale brown palladium-containing composite oxide powder represented by the compositional formula: $(La_{0.7}Sr_{0.2}Ba_{0.1})(Sc_{0.981}Pd_{0.019})H_{0.05}O_{2.8655}$, was added 4 ml of concentrated hydrochloric acid, followed by heating at 60° C. for 6 hours. As a result, the precipitates disappeared, to thereby obtain a pale brown solution.

Example 22

[Elution of Platinum Contained in Platinum-containing Composite Oxide Powder, with Concentrated Hydrochloric Acid]

To 20 mg of a blue platinum-containing composite oxide powder represented by the compositional formula: $(La_{0.7}Sr_{0.2}Ba_{0.1})(Sc_{0.993}Pt_{0.007})H_{0.05}O_{2.8785}$, was added 4 ml of concentrated hydrochloric acid, followed by heating at 60° C. for 6 hours. As a result, the precipitates disappeared, to thereby obtain a colorless solution. On the other hand, 30 minutes after the heating, colorless precipitates were obtained. At this point, by adding a small amount of water thereto, the precipitates were completely dissolved, to thereby obtain a colorless solution.

Example 23

[Elution of Platinum Contained in Platinum-containing Composite Oxide Powder, with Dilute Hydrochloric Acid]

To 20 mg of a blue platinum-containing composite oxide powder represented by the compositional formula: $(La_{0.7}Sr_{0.2}Ba_{0.1})(Sc_{0.993}Pt_{0.007})H_{0.05}O_{2.8785}$, was added 4 ml of 1N dilute hydrochloric acid, followed by heating at 60° C. for 3 hours. As a result, the precipitates disappeared, to thereby obtain a colorless solution.

Example 24

[Elution of Platinum Contained in Platinum-containing Composite Oxide Powder, with Dilute Nitric Acid]

To 20 mg of a blue platinum-containing composite oxide powder represented by the compositional formula: $(La_{0.7}Sr_{0.2}Ba_{0.1})(Sc_{0.993}Pt_{0.007})H_{0.05}O_{2.8785}$, was added 4 ml of 1N dilute nitric acid, followed by heating at 60° C. for 4 hours. As a result, the precipitates disappeared, to thereby obtain a colorless solution.

Example 25

[Elution of Platinum Contained in Platinum-containing Composite Oxide Powder, with Acetic Acid]

To 20 mg of a blue platinum-containing composite oxide powder represented by the compositional formula: $(La_{0.7}Sr_{0.2}Ba_{0.1})(Sc_{0.993}Pt_{0.007})H_{0.05}O_{2.8785}$, was added 4 ml of 50% acetic acid, followed by heating at 60° C. for 40 hours. As a result, the precipitates disappeared, to thereby obtain a colorless solution.

Example 26

[Elution of Ruthenium Contained in Ruthenium-containing Composite Oxide Powder, with Concentrated Hydrochloric Acid]

To 20 mg of a yellow-brown ruthenium-containing composite oxide powder represented by the compositional formula: $(La_{0.7}Sr_{0.2}Ba_{0.1})(Sc_{0.93}Ru_{0.07})H_{0.05}O_{2.91}$, was added 4 ml of concentrated hydrochloric acid, followed by heating at 60° C. for 8 hours, to thereby obtain a dark brown solution containing colorless precipitates. By adding a small amount of water thereto, the precipitates were dissolved.

Example 27

[Elution of Ruthenium Contained in Ruthenium-containing Composite Oxide Powder, with Sulfuric Acid]

To 20 mg of a yellow-brown ruthenium-containing composite oxide powder represented by the compositional formula: $(La_{0.7}Sr_{0.2}Ba_{0.1})(Sc_{0.93}Ru_{0.07})H_{0.05}O_{2.91}$, was added 4 ml of 6-N sulfuric acid, followed by heating at 60° C. for 6 hours, to thereby obtain a dark brown solution containing colorless precipitates.

Example 28

[Elution of Iridium Contained in Iridium-containing Composite Oxide Powder, with Concentrated Hydrochloric Acid]

To 20 mg of a dark brown iridium-containing composite oxide powder represented by the compositional formula: $(La_{0.66}Sr_{0.19}Ba_{0.08}Ir_{0.07})(Sc_{0.93}Ir_{0.07})H_{0.05}O_{2.89}$, was added 4 ml of concentrated hydrochloric acid, followed by heating at 60° C. for 6 hours. As a result, the precipitates disappeared, to thereby obtain a pale brown solution.

Example 29

[Elution of Molybdenum Contained in Molybdenum-containing Composite Oxide Powder, with Concentrated Hydrochloric Acid]

To 20 mg of a blue-green molybdenum-containing composite oxide powder represented by the compositional formula: $(La_{0.7}Sr_{0.2}Ba_{0.1})(Sc_{0.75}Mo_{0.25})H_{0.02}O_{2.985}$, was added 4 ml of concentrated hydrochloric acid, followed by heating at 60° C. for 8 hours, to thereby obtain a colorless solution containing colorless precipitates. By adding a small amount of water thereto, the precipitates were dissolved.

Example 30

[Elution of Gold Contained in Gold-containing Composite Oxide Powder, with Concentrated Hydrochloric Acid]

To 20 mg of a pale brown gold-containing composite oxide powder represented by the compositional formula: $(La_{0.7}Sr_{0.2}Ba_{0.1})(ScAu_{0.000006})H_{0.05}O_{2.875}$, was added 4 ml of concentrated hydrochloric acid, followed by heating at 60° C. for 6 hours. As a result, the precipitates disappeared, to thereby obtain a colorless solution.

Example 31

[Elution of Rhenium Contained in Rhenium-containing Composite Oxide Powder, with Concentrated Hydrochloric Acid]

To 20 mg of an orange rhenium-containing composite oxide powder represented by the compositional formula: $(La_{0.7}Sr_{0.2}Ba_{0.1})(Sc_{0.965}Re_{0.03}O_{0.05}O_{2.8925}$, was added 4 ml of concentrated hydrochloric acid, followed by heating at 60° C. for 6 hours. As a result, the precipitates disappeared, to thereby obtain a colorless solution.

Example 32

[Elution of Platinum Contained in Platinum-containing Composite Oxide Powder, with Concentrated Hydrochloric Acid]

To 20 mg of a blue platinum-containing composite oxide powder represented by the compositional formula: $Sr(Zr_{0.899}Y_{0.099}Pt_{0.002})H_{0.05}O_{2.9755}$, was added 4 ml of concentrated hydrochloric acid, followed by heating at 60° C. for 1 hour. As a result, the precipitates disappeared, to thereby obtain a colorless solution.

Example 33

[Elution of Ruthenium Contained in Ruthenium-containing Composite Oxide Powder, with Concentrated Hydrochloric Acid]

To 20 mg of a dark brown ruthenium-containing composite oxide powder represented by the compositional formula: $Sr(Zr_{0.838}Y_{0.038}Ru_{0.124})H_{0.03}O_{2.996}$, was added 4 ml of concentrated hydrochloric acid, followed by heating at 60° C. for 1 hour, to thereby obtain a dark brown solution containing colorless precipitates. By adding a small amount of water thereto, the precipitates were dissolved.

Example 34

[Elution of Iridium Contained in Iridium-containing Composite Oxide Powder with Concentrated Hydrochloric Acid]

To 20 mg of a brown iridium-containing composite oxide powder represented by the compositional formula: $Sr(Zr_{0.889}Y_{0.089}Ir_{0.022})H_{0.05}O_{2.9695}$, was added 4 ml of concentrated hydrochloric acid, followed by heating at 60° C. for 1 hour. As a result, the precipitates disappeared, to thereby obtain a pale brown solution.

Example 35

[Elution of Platinum Contained in Platinum-containing Composite Oxide Powder, with Concentrated Hydrochloric Acid]

To 20 mg of a pale brown platinum-containing composite oxide powder represented by the compositional formula: $(La_{0.9}Ca_{0.1})(AlPt_{0.000002})O_{2.95}$, was added 4 ml of concentrated hydrochloric acid, followed by heating at 60° C. for 6 hours. As a result, the precipitates disappeared, to thereby obtain a colorless solution.

Example 36

[Elution of Platinum Contained in Platinum-containing Composite Oxide Powder, with Concentrated Hydrochloric Acid]

To 20 mg of a pale brown platinum-containing composite oxide powder represented by the compositional formula: $La(Sc_{0.9498}Zn_{0.0498}Pt_{0.0004})H_{0.02}O_{2.9853}$, was added 4 ml of concentrated hydrochloric acid, followed by heating at 60° C. for 2 hours. As a result, the precipitates disappeared, to thereby obtain a colorless solution.

The invention claimed is:

1. A method of storing a metal component, comprising: heating a metal-containing material in the presence of a perovskite-type composite oxide represented by Composition formula (1), to store a metal component of the material in the perovskite-type composite oxide:

Composition formula (1):

$$ABH_aO_{3-b} \quad (1)$$

wherein

A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table;

symbols a and b represent quantities of hydrogen and oxygen vacancies, respectively, and represent values within the range below, respectively: $0 \le a \le 1.0$, $0 \le b \le 0.5$, wherein the metal component is stored as an ion thereof, and wherein heating is performed such that the metal-containing material and the perovskite-type composite oxide are not in contact with each other.

2. The method of storing a metal component according to claim 1, wherein the perovskite-type composite oxide satisfies conditions in which a tolerance factor (t) defined by the following formula is within a range of 0.75 to 1.15:

Formula:

$$t=(r_A+r_O)/(2^{1/2} \cdot (r_B+r_O))$$

wherein $r_A$ represents an arithmetic mean of ionic radii of A, $r_B$ represents an arithmetic mean of ionic radii of B, and $r_O$ represents the ionic radius of oxide ion ($O^{2-}$) and is 1.40Å.

3. The method of storing a metal component according to claim 1, wherein heating is conducted in a state in which a vapor of a metal or metal oxide produced by heating the metal-containing material and the perovskite-type composite oxide is brought into contact with the composite oxide.

4. The method of storing a metal component according to claim 1, wherein the metal-containing material and the perovskite-type composite oxide are heated, by placing those in one container.

5. The method of storing a metal component according to claim 1, wherein a heating temperature is 900 to 1,750° C.

6. The method of storing a metal component according to claim 1, wherein the metal-containing material is in a solid phase state.

7. The method of storing a metal component according to claim 1, wherein the metal component is at least one element selected from Groups 6, 7, 8, 9, 10, and 11 of the periodic table.

8. A method of eluting the metal component in an acid, comprising: treating the composite oxide according to claim 1 in which the metal component is stored with an acid.

9. The method of eluting the metal component according to claim 8, wherein the acid is at least one acid selected from hydrochloric acid, nitric acid, aqua regia, sulfuric acid, and acetic acid.

10. A method of recovering the metal component, comprising: recovering the metal component eluted in the acid according to claim 8, from the acid.

11. A method of producing a metal, comprising the combination of:

a method of storing a metal component, comprising:
heating a metal-containing material in the presence of a perovskite-type composite oxide represented by Composition formula (1), to store a metal component of the material in the perovskite-type composite oxide, wherein the metal component is stored as an ion thereof:

Composition formula (1):

$$ABH_aO_{3-b} \quad (1)$$

wherein

A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table;

symbols a and b represent quantities of hydrogen and oxygen vacancies, respectively, and represent values within the range below, respectively: $0 \leq a \leq 1.0$, $0 \leq b \leq 0.5$;

and wherein heating is performed such that the metal-containing material and the perovskite-type composite oxide are not in contact with each other;

a method of eluting the metal component in an acid, comprising:

treating the aforementioned composite oxide in which the metal component is stored, with an acid; and a method of recovering the metal component, comprising:

recovering the metal component eluted in the aforementioned acid, from the acid.

12. A method of storing a metal component, comprising:

heating a metal-containing material in the presence of a perovskite-type composite oxide represented by Composition formula (1), to store a metal component of the material in the perovskite-type composite oxide, wherein the metal component is stored as an ion thereof:

Composition formula (1):

$$ABH_aO_{3-b} \qquad (1)$$

wherein

A represents at least one element selected from the group consisting of lanthanoid elements and Group 2 elements of the periodic table, and B represents at least one element selected from the group consisting of Group 3 elements, Group 4 elements, Group 13 elements, and transition metal elements of the fourth period of the periodic table;

symbols a and b represent quantities of hydrogen and oxygen vacancies, respectively, and represent values within the range below, respectively: $0 \leq a \leq 1.0$, $0 \leq b \leq 0.5$, and wherein heating is conducted in a state in which a vapor of a metal or metal oxide produced by heating the metal-containing material and the perovskite-type composite oxide is brought into contact with the composite oxide.

* * * * *